(12) United States Patent
Lilbert

(10) Patent No.: US 11,329,736 B2
(45) Date of Patent: May 10, 2022

(54) AUTOCALIBRATION OF AN ANTENNA ARRAY

(71) Applicant: SAFRAN ELECTRONICS & DEFENSE, Paris (FR)

(72) Inventor: Arnaud Lilbert, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/287,026

(22) PCT Filed: Oct. 25, 2019

(86) PCT No.: PCT/EP2019/079289
§ 371 (c)(1),
(2) Date: Apr. 20, 2021

(87) PCT Pub. No.: WO2020/089125
PCT Pub. Date: May 7, 2020

(65) Prior Publication Data
US 2021/0384992 A1    Dec. 9, 2021

(30) Foreign Application Priority Data
Oct. 29, 2018 (FR) ...................................... 1801144

(51) Int. Cl.
*H04B 17/21* (2015.01)
*H04B 7/08* (2006.01)
(52) U.S. Cl.
CPC ............... *H04B 17/21* (2015.01); *H04B 7/08* (2013.01)

(58) Field of Classification Search
CPC .................................. H04B 7/08; H04B 17/21
See application file for complete search history.

(56) References Cited

U.S. PATENT DOCUMENTS

| | | | |
|---|---|---|---|
| 6,665,545 B1 | 12/2003 | Raleigh et al. | |
| 2006/0044185 A1 | 3/2006 | Jin et al. | |
| 2016/0020817 A1* | 1/2016 | Chen | H04B 17/12 370/278 |

OTHER PUBLICATIONS

Dec. 10, 2019 International Search Report issued in International Patent Application No. PCT/EP2019/079289.

* cited by examiner

*Primary Examiner* — Curtis B Odom
(74) *Attorney, Agent, or Firm* — Oliff PLC; R. Brian Drozd

(57) ABSTRACT

An equipment comprising an array of radio antennas and a switching device placed as a cutoff between the antennas and the associated reception channels, the switching device comprising a first so-called operational operating mode wherein each input interface is then connected directly to a different output interface so as to connect each antenna with at least the associated reception channel thereof, and a second so-called calibration operating mode, wherein an input interface corresponding to a predetermined antenna is then connected to all the output interfaces so as to transmit the electrical signal coming from the predetermined antenna to all the reception channels, the equipment being adapted for implementing a method for autocalibration of the reception channels when the switching device is in the second operating mode.

5 Claims, 3 Drawing Sheets

AUTOCALIBRATION OF AN ANTENNA ARRAY

TECHNICAL FIELD

The present invention relates to the technical field of antenna arrays for spatiotemporal processing. The present invention relates more particularly to a method for autocalibration of an antenna array for spatiotemporal processing.

PRIOR ART

An antenna array is a device comprising a plurality of distinct radio antennas, positioned with respect to each other in a predetermined manner. An antenna array may serve to receive a radio signal, each antenna receiving said radio signal with a phase difference and/or an attenuation particular to the position thereof, and converting said radio signal into an electrical signal. The plurality of electrical signals coming from the antenna array are transmitted to an electronic device adapted to combine these electrical signals. It is then possible to implement so-called "beam formation" techniques (or also "spatial filtering", "channel formation" or "beamforming") in order to modify a radiation diagram of the antenna array in one or more directions. It is thus possible to highly attenuate a gain of the antenna array in the direction of one or more radio sources (a technique known as "nulling") and/or to increase the gain of the antenna array in the direction of other radio signal sources (a technique known as "beamforming" or "beammastering").

Though an antenna array, by virtue of the beamforming techniques, can offer a performance superior to an isolated antenna, this antenna array does however require to be calibrated for gain and phase in order to function optimally.

A set of components is associated with each antenna of an antenna array, for transmitting the electrical signal coming from the antenna to the electronic device for combining the electrical signals coming from the plurality of antennas (hereinafter a processing unit). This set of components may comprise filters, amplifiers, attenuators, mixers or any other electronic component for processing an electrical signal. This set of components is called the reception channel. Thus each antenna is connected via an associated reception channel to the electronic device for combining the electrical signals or processing unit. The various components of the transmission channels may be particularly dispersive, for example for reason of variability of the characteristics from one component to another or because of variability according to the temperature of use of a component. It is despite everything necessary for the gain and/or phase-difference characteristics of each reception channel to be as close as possible in order to optimise the implementation by the processing unit of the beamforming techniques.

A first known solution to this problem of calibrating an antenna array is illustrated in FIG. 1. FIG. 1 illustrates schematically a functional solution for calibrating equipment comprising an antenna array according to a first known embodiment. The antenna array comprises here three antennas 101, 102 and 103, the solution being applicable to any other different number of antennas used. The antenna 101, and respectively the antenna 102 or 103, is connected to the processing unit 120 via a reception channel 110, and respectively a reception channel 111 or 112. The calibration is done by means of a radio signal source 150, referred to as the reference source 150, adapted to emit a so-called reference radio signal. The reference source 150 is disposed outside the equipment comprising the antenna array, at a distance "d", this distance "d" being sufficiently great for the radio signal coming from the reference source 150 to be able to be considered at the antenna array to be a far field. In other words, the antenna array must be in a zone known as a "Fraunhofer region" with respect to the reference source, i.e. remote by a distance greater than the equivalent of several wavelengths of the reference radio signal used. The reference source 150 is seen from the antenna array at an angle "θ". The first solution requires the distance "d" and the angle "θ" to be constant during calibration, which may be a problem if the equipment comprising the antenna array is in movement. The reference radio signal is received by each antenna, transmitted via each reception channel and captured by a measuring unit 130, this measuring unit 130 possibly being able to be integrated in the processing unit 120. The measuring unit 130 is adapted to measure a difference in gain and/or phase between each electrical signal captured. The measuring unit 130 can supply the result of the measurement to a compensation device 140 adapted to modify each reception channel 110, 111 and 112 for gain and/or phase in order to compensate for the differences in gain and/or phases measured according to the angle "θ" at which the reference source 150 is seen.

This first solution, referred to as "in radiated mode", has the following drawbacks:
- a dependency on an external reference source, complicating the performance of the calibration, especially for equipment comprising the antenna array in movement,
- the reference source 150 must be placed at an angle "θ" with respect to the antenna array, this angle having to be known and/or measurable and fixed during the calibration phase, which there again may be complicated,
- the reference source 150 must be placed at a certain distance "d" from the equipment in order to guarantee an emission from the reference source 150 in far field, this distance there again having to be fixed during the calibration phase.

Finally, this first calibration solution is operationally very constraining.

A second solution is illustrated in FIG. 2. This second solution is distinguished from the first solution by the use of an internal reference source 160 instead of the external reference source 150. In other words, the reference source 160 is placed in the equipment comprising the antenna array. A reference radio signal emitted by the reference source 160 is injected into each reception channel 110, 111 and 113, for example by means of radio couplers 171, 172 and 173. In a similar manner to the first solution, a measuring unit (not shown) and a compensation device (not shown) make it possible to measure the differences in gain and/or phase output from the reference channels and to compensate for them.

This second solution, referred to as "in conducted mode", has the following drawbacks:
- the antennas 101, 102 and 103 are not taken into account during a calibration phase, the reference signal being injected at the output of each antenna,
- the radio couplers 171, 172 and 173 may themselves introduce gain and/or phase difference at the input of the reception channels,
- the calibration phase cannot be performed under operational conditions, since the reference signal disturbs the processing performed by the processing unit.

Thus it is necessary to present a solution allowing calibration of equipment comprising an antenna array, this calibration having to:

take into account a maximum number of the elements constituting the reception chain, from each antenna as far as the processing unit, be as robust as possible faced with errors in the reference signal (for example faulty placement or displacement of the external reference source), guarantee autonomy of the equipment comprising the antenna array for calibration thereof, the calibration being able to be performed under possibly degraded operational conditions.

DISCLOSURE OF THE INVENTION

The invention relates to equipment comprising an array of radio antennas, each antenna being connected via at least one associated reception channel to a processing unit adapted to implement a beamforming technique, the equipment comprising a switching device placed as a cutoff between the antennas and the associated reception channels, the switching device comprising:
input interfaces in the same number as the antennas, each input interface allowing a connection of an antenna,
output interfaces in the same number as the reception channels, each output interface allowing a connection of a reception channel,
the switching device comprising two operating modes:
a first so-called operational operating mode, each input interface then being connected directly to a different output interface in order to connect each antenna with at least its associated reception channel,
a second so-called calibration operating mode, an input interface corresponding to a predetermined antenna then being connected to all the output interfaces in order to transmit the electrical signal coming from the predetermined antenna to all the reception channels,
the equipment being adapted to implement a method for calibrating the reception channels when the switching device is in the second operating mode.

According to one embodiment of the invention, the equipment comprises:
a measuring unit, adapted to capture an electrical signal output from each reception channel and to determine physical parameters associated with said electrical signal,
a compensation device, adapted to configure each reception channel according to the physical parameters associated with the electrical signals determined at the output of the reception channels.

According to one embodiment of the invention, the switching device comprises:
a chain of electrical-signal divider elements, each divider element comprising one input and two outputs, the input of the first divider element of the chain being connected to the input interface of the predetermined antenna, an output of the first divider element being connected to the output interface corresponding to the input interface, the chain of divider elements being adapted to divide the electrical signal coming from the input interface connected to the predetermined antenna into as many electrical signals are there are reception channels,
switches, each switch comprising two inputs and one output, the outputs of the switches being connected to each output interface, except for the one corresponding to the reception channel of the predetermined antenna, each input of the switches being connected to an input interface and to a divider element of the chain of divider elements, the switching element making it possible to connect one or other of these two inputs to the output interface,
the switches being adapted for:
in the first operating mode, transmitting the electrical signal coming from each input interface to at least one output interface, each antenna then being connected at least to its associated reception channel,
in the second operating mode, transmitting the electrical signal coming from the divider element, the predetermined antenna then being connected to all the reception channels.

According to one embodiment of the invention, the equipment comprises:
an electrical-signal divider element connected to each input interface, except for the one connected to the predetermined antenna, an output of the divider element being connected to the switch connected to the output interface corresponding to the input interface, the other output being connected to a predetermined impedance matching load,
a divider element and a switch connected in series, the outputs of the divider element being connected to the inputs of the switch, and placed as a cutoff between the output of the first divider element connected to the output interface corresponding to the input interface and said output interface.

The invention also relates to a method for autocalibration of the equipment comprising an array of radio antennas, the method comprising the steps of:
switching the switching device into the second operating mode,
capturing the electrical signal output from each reception channel,
determining physical parameters associated with said electrical signals,
configuring each reception channel according to the physical parameters associated with the electrical signals determined at the output of the reception channels,
switching the switching device into the first operating mode.

The invention also relates to a computer program comprising instructions for implementing, by a processor of the equipment comprising an array of radio antennas, the method for autocalibration of the equipment, when the computer program is executed by the processor.

The invention also relates to a recording medium, possibly able to be read by the equipment, whereon said computer program is stored.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 3:
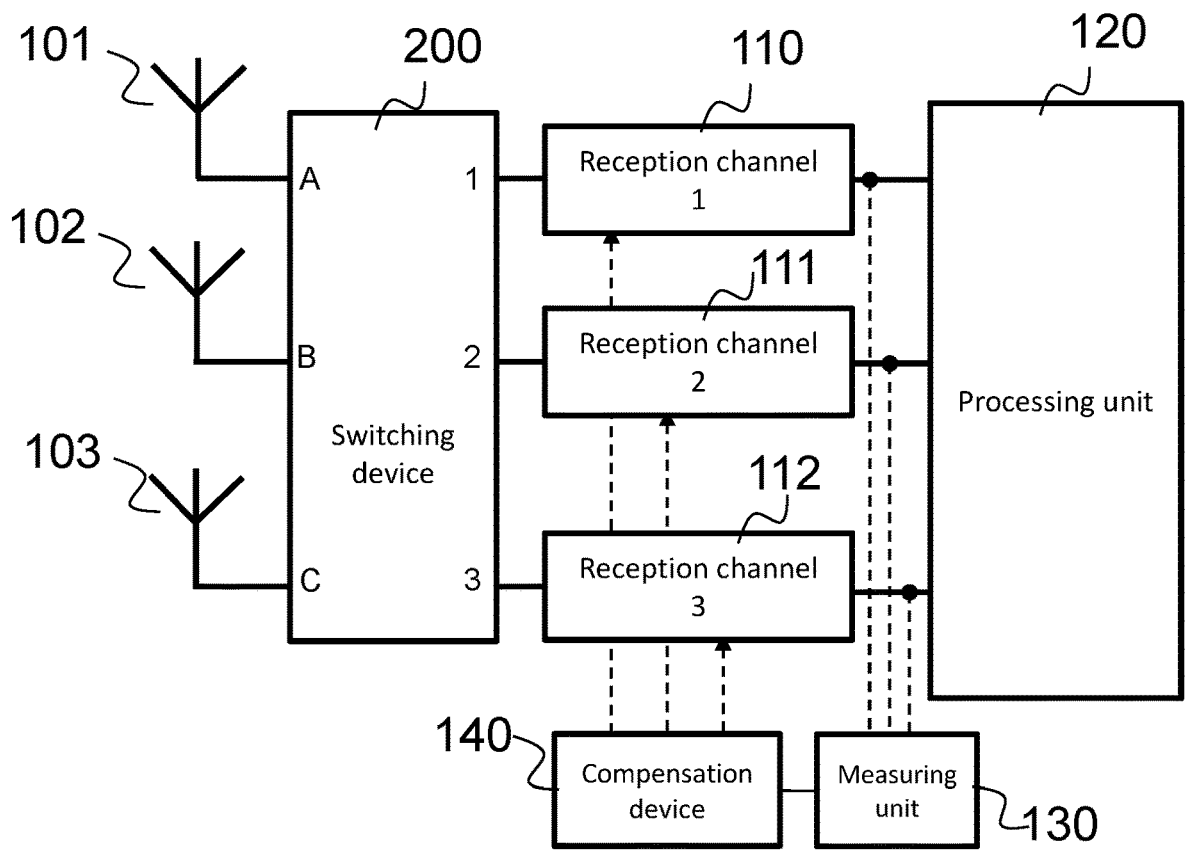
FIG. 3 illustrates schematically a functional solution for calibrating equipment comprising an antenna array according to an embodiment of the invention.

FIG. 3 illustrates schematically a functional solution for calibrating equipment comprising an antenna array 101, 102, 103 according to one embodiment of the invention.

The equipment illustrated in FIG. 3 comprises an array of radio antennas 101, 102 and 103. According to the embodiment of the invention, the antenna array may comprise any plurality of antennas. Each antenna 101, 102 and 103 is connected via at least one associated reception channel 110, 111, 112 to the processing unit 120 adapted to implement a beamforming technique. The equipment comprises a switching device 200 placed as a cutoff between the antennas 101, 102, 103 and the associated reception channels 110, 111, 112. The equipment illustrated in FIG. 3 is therefore distinguished from the equipment illustrated in FIG. 1 and the equipment illustrated in FIG. 2 through the presence of the switching device 200 placed as a cutoff between the antennas 101, 102 and 103 and the reception channels 110, 111 and 112. Thus the antenna 101, and respectively the antenna 102 or 103, is connected to an input interface "A" of the switching device 200, and respectively an input interface "B" or "C" of the switching device.

Likewise, the reception channel 110, and respectively the reception channel 111 or 112, is connected to an output interface "1" of the switching device 200, and respectively an output interface "2" or "3" of the switching device.

The switching device 200 comprises:
input interfaces ("A", "B" and "C") in the same number as the antennas 101, 102, 103, each input interface allowing a connection of an antenna,
output interfaces ("1", "2", "3") in the same number as the reception channels 110, 111, 112, each output interface allowing a connection of a reception channel.

In other words, the switching device 200 is placed as a cutoff between the antennas and the associated reception channels thereof. An input interface of the switching device 200 then corresponds to an output interface of the switching device 200 in the sense that said input interface is connected to an antenna and said output interface is connected to the reception channel associated with said antenna.

The switching device 200 comprises two operating modes:
a first so-called operational operating mode, each input interface then being connected directly to a different output interface so as to connect each antenna with at least the associated reception channel thereof,
a second so-called calibration operating mode, an input interface corresponding to a predetermined antenna then being connected to all the output interfaces so as to transmit the electrical signal coming from the predetermined antenna to all the reception channels.

Thus, in the first operating mode, the operation of the switching device 200 is transparent in that the electrical signal coming from each antenna is transmitted directly to the reception channel associated with said antenna. The operation of the equipment is then in this operating mode similar to that of equipment that does not comprise any switching device, each antenna being directly connected to the respective reception channel thereof.

In the second operating mode, the electrical signal coming from a predetermined antenna, referred to as the reference antenna, is distributed over all the reception channels. This electrical signal coming from the reference antenna is distributed instead of the signals received by the other antennas. Each reception channel then receives the same electrical signal coming from the same reference antenna.

The same electrical signal means an electrical signal with the same phase, but possibly a different power. The power of each electrical signal output from the output interfaces of the switching device may vary. The switching device 200 may attenuate differently, but in a predetermined manner, the electrical signal received from the reference antenna output from each of the output interfaces thereof.

The equipment is adapted to implement a method for calibrating the reception channels when the switching device is in the second operating mode. This calibration method comprises the steps of:
switching the switching device into the second operating mode,
capturing an electrical signal output from each reception channel,
determining physical parameters associated with said electrical signals,
configuring each reception channel according to the physical parameters associated with the electrical signals determined at the output of the reception channels,
switching the switching device into the first operating mode.

In the second operating mode, the equipment therefore uses as the calibration source the radio signal received by a predetermined antenna or reference antenna. The choice of this antenna is arbitrary among the plurality of antennas of the antenna array.

In the absence of a particular radio signal in the environment of the equipment, the radio signal received by each antenna of the antenna array can be assimilated to a thermal noise and is different for each antenna. It would therefore not be possible to calibrate the antenna array using the signals received by each antenna, these being different. On the other hand, the equipment disclosed in the presence application, by selecting the radio signal of a single predetermined antenna and distributing this same signal over all the reception channels makes it possible to guarantee the use of an identical signal on each reception channel, and therefore allows calibration of the reception channels. According to one embodiment of the invention, the antennas of the antenna array are previously calibrated in order to have identical characteristics.

When a particular radio signal is present in the environment of the equipment, each antenna can therefore receive this same radio signal. It is however not possible to use this radio signal in order to calibrate the antenna array, the positioning characteristics of the source of the radio signal being unknown (incident angle "θ" or distance "d" from the source, cf. FIG. 1).

Thus, whether it is in the absence or in the presence of a radio signal, the equipment disclosed makes it possible to perform autocalibration of the reception channels. The solution is based neither on an external source (cf. external source 150 in FIG. 1) nor on an internal source (cf. internal source 160 in FIG. 2), which simplifies the technical architecture of the equipment.

It should be noted that, in the second operating mode, the radio signal received by the reference antenna is ultimately transmitted to the processing unit 120. This means that, in the second embodiment, the equipment can continue to receive a radio signal and is therefore operational. Only the implementation of the beamforming techniques is not possible in the second embodiment. This has an advantage compared with the solution as presented in FIG. 2, this solution using an internal reference source not making it possible to continue to receive a radio signal during the calibration phase, the reference or calibration signal interfering with the reception of other radio signals.

Figure 1:
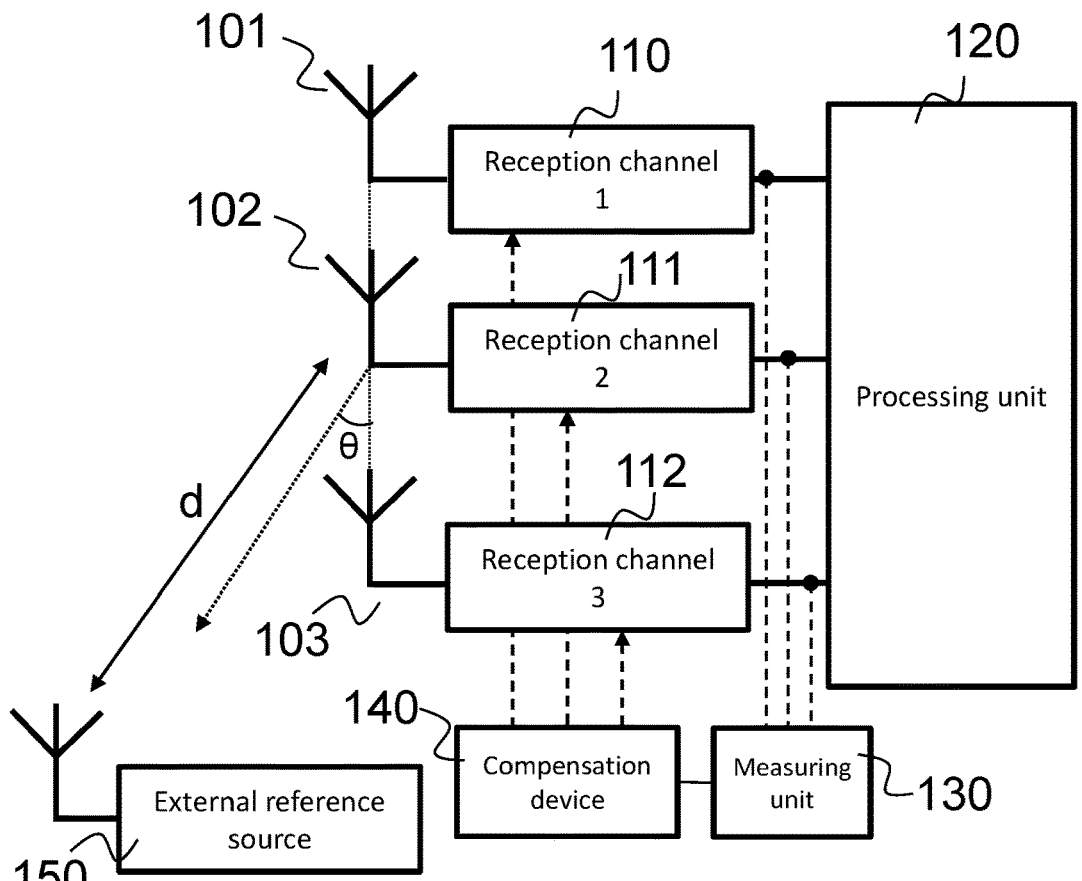
FIG. 1 illustrates schematically a functional solution for calibrating equipment comprising an antenna array according to a first known embodiment.
Figure 2:
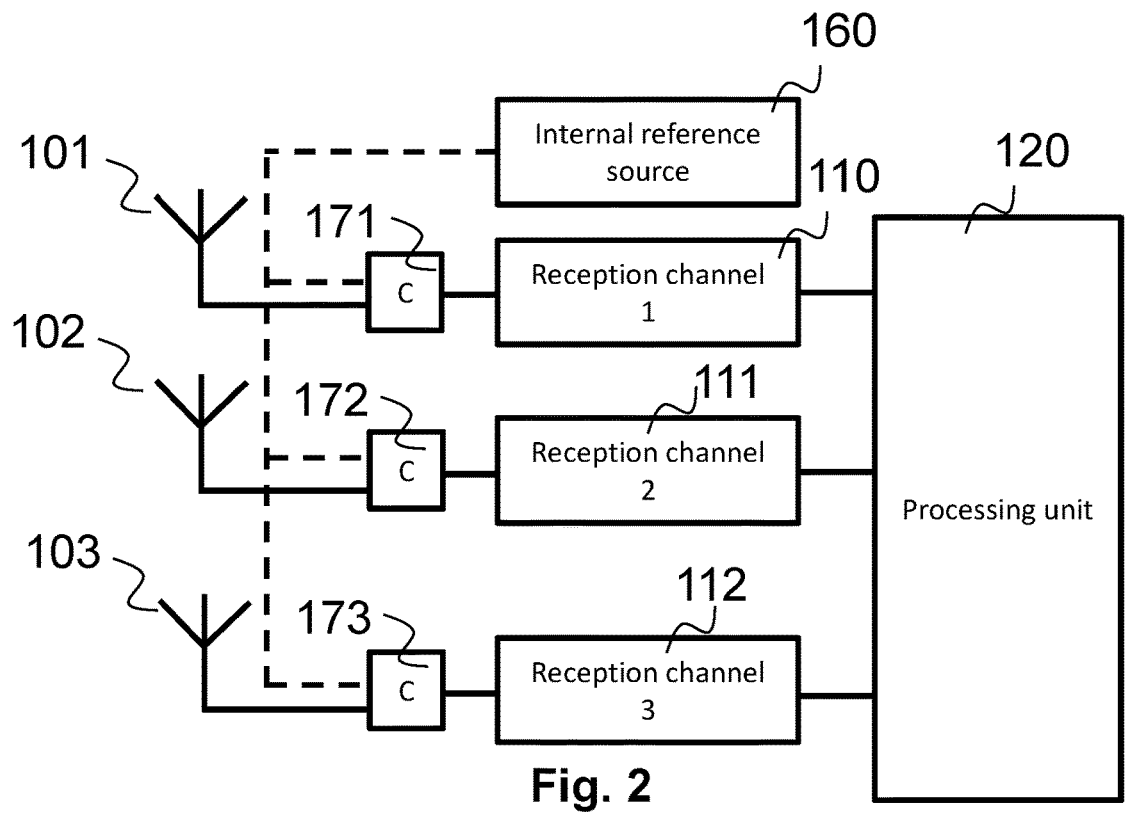
FIG. 2 illustrates schematically a functional solution for calibrating equipment comprising an antenna array according to a second known embodiment.

It should also be noted that obviously the solution presented in FIG. 3 makes it possible to dispense with an external reference source and is therefore operationally easier to implement than the solution presented in FIG. 1 with the external reference source 150.

According to one embodiment of the invention, the equipment comprises:
- a measuring unit 130, adapted to capture an electrical signal output from each reception channel and to determine physical parameters associated with said electrical signal,
- a compensation device 140, adapted to configure each reception channel according to the physical parameters associated with the electrical signals determined at the output of the reception channels.

According to an alternative embodiment of the invention, the processing unit 120 integrates the measuring unit 130 and/or the compensation device 140.

Figure 4:
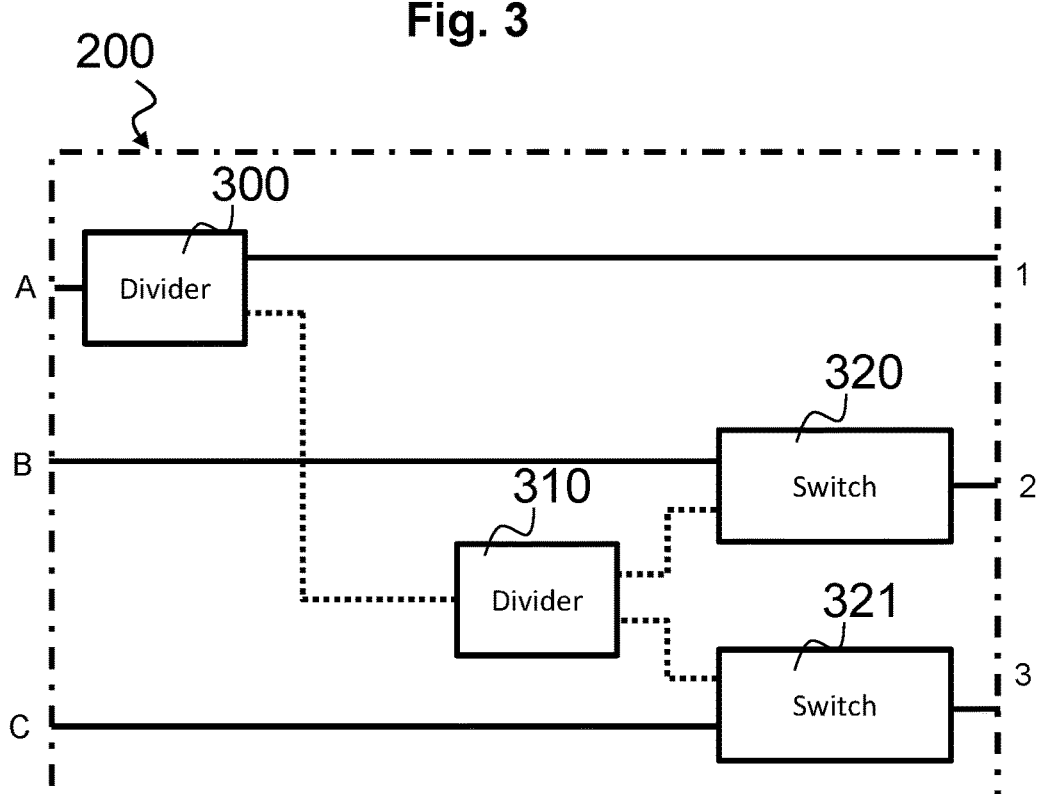
FIG. 4 illustrates schematically an architecture of a switching device for a calibration solution according to a first embodiment of the invention.

FIG. 4 illustrates schematically an architecture of a switching device 200 for a calibration solution according to a first embodiment of the invention. In this example, as well as for the example illustrated below in FIG. 5, the predetermined antenna or reference antenna is chosen arbitrarily as being connected to the input interface "A" of the switching device 200. The switching device 200 may in particular comprise electrical-signal divider elements and switches.

An electrical-signal divider element—or power divider—comprises three ports: one input port and two output ports. An electrical-signal divider element makes it possible to divide the power of the electrical signal arriving on the input port by distributing it over the two output ports. Thus each output port of the electrical-signal divider element outputs an electrical signal similar to the electrical signal applied to the input port, the power of the output signal being however divided by two compared with the power of the electrical signal at the input of the electrical-signal divider element. An electrical-signal divider element is for example a Wilkinson divider.

A switch comprises a plurality of input ports, each input port being able to receive an electrical signal coming from a source connected to said input port, and is adapted to select an electrical signal received on one of the input ports. The electrical signal selected, that is to say corresponding to the input port selected, is redirected to an output port. A switch may for example comprise two input ports and one output port. The switch is then adapted to redirect the electrical signal received on one or other of the input ports to the output port. In other words, the switch makes it possible to select as an output one or other of the electrical signals received at an input.

The switching device 200 may thus comprise:
- a chain of electrical-signal divider elements 300, 310, each divider element 300, 310 comprising one input and two outputs, the input of the first divider element 300 of the chain being connected to the input interface "A" of the predetermined antenna, an output of the first divider element being connected to the output interface "1" corresponding to the input interface "A", the chain of divider elements 300, 310 being adapted to divide the electrical signal coming from the input interface "A" connected to the predetermined antenna into as many electrical signals as there are reception channels,
- switches 320, 321, each switch 320 and 321 comprising two inputs and one output, the outputs of the switches being connected to each output interface "2" and "3" (except for the output "1" corresponding to the reception channel of the predetermined antenna), each input of the switches being connected to an input interface "B" and "C" and to a divider element 310 of the chain of divider elements, the switching element 320 or 321 making it possible to connect one or other of these two inputs to the output interface "2" or "3".

The switches 320 and 321 are adapted for:
- in the first operating mode, transmitting the electrical signal coming from each input interface "A", "B" and "C" to an output interface "1", "2" and "3", each antenna 101, 102, 103 then being connected to the associated reception channel thereof 110, 111, 112,
- in the second operating mode, transmitting the electrical signal coming from the divider element 310, the predetermined antenna then being connected to all the reception channels 110, 111 and 112.

In FIG. 4, the broken line represents symbolically the path of the electrical signal coming from the reference antenna connected to the input interface "A" and having been "divided" by the first divider element 300 and next by the second divider element 310 of the chain. This electrical signal represented in a broken line therefore arrives at the input of the switches 320 and 321, these two switches 320 and 321 being adapted, in the second embodiment, for transmitting this electrical signal coming from the divider element 310 at the output interfaces "2" and "3".

Figure 5:
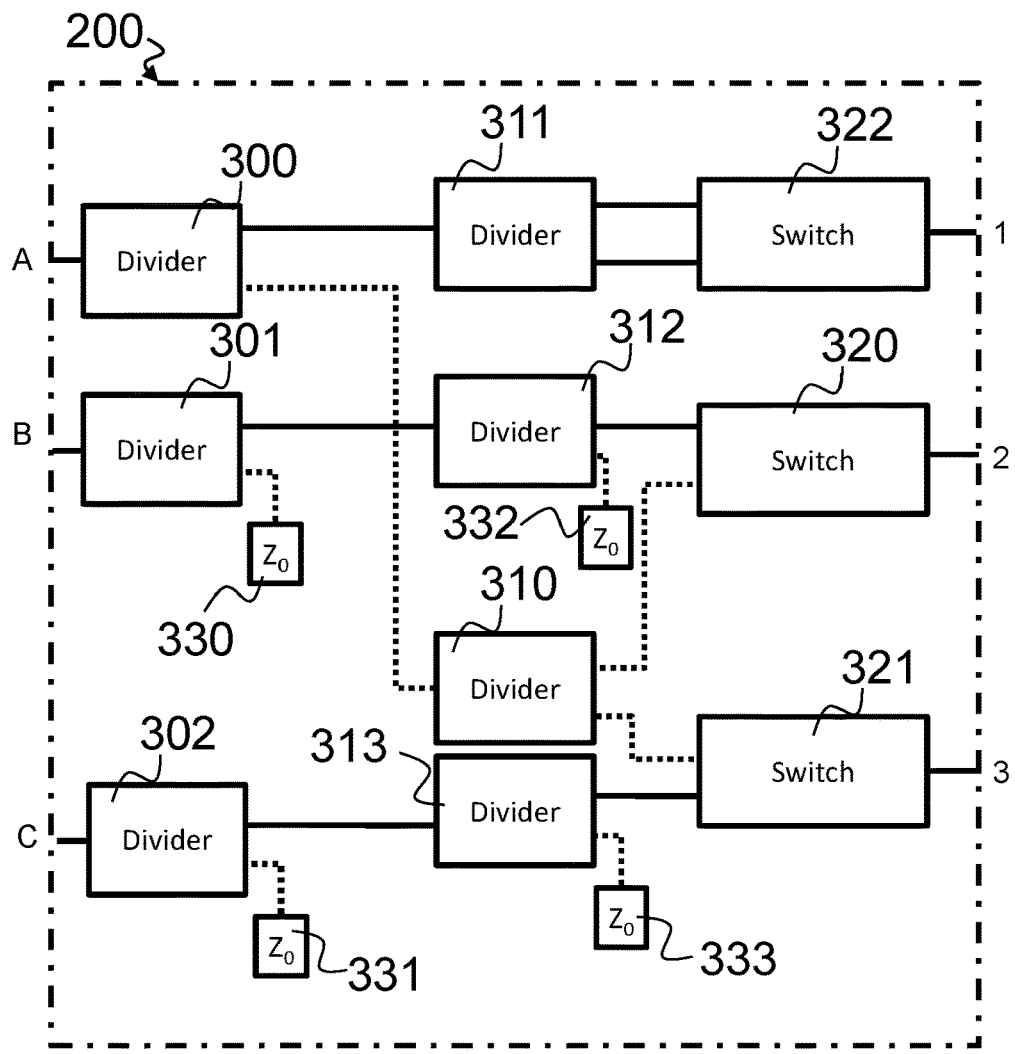
FIG. 5 illustrates schematically an architecture of a switching device for a calibration solution according to a second embodiment of the invention.

FIG. 5 illustrates schematically an architecture of a switching device 200 for a calibration solution according to a second embodiment of the invention. In this example, as for the example illustrated previously in FIG. 4, the predetermined antenna, or reference antenna, is chosen arbitrarily as being connected to the input interface "A" of the switching device 200. According to this second embodiment, the switching device 200 illustrated in FIG. 4 is improved. This improvement comprises:
- an addition of a divider element 311 and of a switch 322 in series between the output of the divider element 300 and of the output interface "1", and
- an addition of dividers 301, 302, 312 and 313, an output of each of these dividers 301, 302, 312 and 313 being connected to a predetermined impedance-matching load 330, 331, 332 and 333.

The value of the predetermined impedance-matching load 330, 331, 332 and 333 is typically that of the characteristic impedance of the equipment, for example 50Ω.

These additions of divider elements and switches make it possible to guarantee that each connection between an input interface "A", "B" or "C" of the switching device 200 and an output interface "1", "2" or "3" passes through the same types of electronic component in the first operating mode and in the second operating mode. Thus each chain of electronic components, that is to say the electronic components between a given input and a corresponding output of the switching device 200, is identical, whether in the first operating mode or in the second operating mode.

Thus, in the case illustrated in FIG. 5, and in the case of the first operating mode:
- an electrical signal arriving from the input interface "A" passes through, so as to reach the output interface "1": the first divider element 300 of the chain of divider elements 300 and 310, the divider element 311 and the switch 322,
- an electrical signal arriving from the input interface "B" passes through, so as to reach the output interface "2": the divider element 301, the divider element 312 and the switch 320, and
- an electrical signal arriving from the input interface "C" passes through, in order to reach the output interface "3": the divider element 302, the divider element 313 and the switch 321.

Each signal arriving through an input port "A", "B" or "C" therefore passes through an identical chain of electronic components, comprising two divider elements and one switch.

Likewise, in the case illustrated in FIG. 5, and in the case of the second operating mode:
- a reference electrical signal arriving from the input interface "A" passes through, in order to reach the output interface "1": the first divider element 300 of the chain of divider elements 300 and 310, the divider element 311 and the switch 322,
- this same reference electrical signal passes through, in order to reach the output interface "2": the divider element 300, the divider element 310 and the switch 320, and
- this same reference electrical signal passes through, in order to reach the output interface "3": the divider element 300, the divider element 310 and the switch 321.

Thus the signal coming from the reference antenna connected to the input interface "A" passes through a chain of components comprising identical components before being distributed on the various reception channels "1", "2" and "3", which makes it possible to guarantee a balancing of the possible disturbances of the reference electrical signal when passing through the switching device 200.

The divider elements 301 and 302, similar to the divider element 300, as well as the matching loads 330 and 331, make it possible to obtain a balancing of the gain and of the phases between the various channels.

The examples given in FIG. 4 and in FIG. 5 are illustrated for an antenna array comprising three antennas. These examples are not limitative and can be implemented for antenna arrays comprising only two antennas, or on the other hand comprising more than three antennas.

The solutions presented therefore allow an autonomous calibration of the equipment, without requiring an external source. This calibration may be performed when the equipment is operational, the reception of a radio signal not being disturbed. Only an implementation of beamforming is essential during the calibration period. This calibration method can therefore be implemented—periodically or on demand—without disturbing a continuity of service. The calibration method can thus be triggered when a predetermined variation in internal temperature of the equipment is detected.

Figure 6:
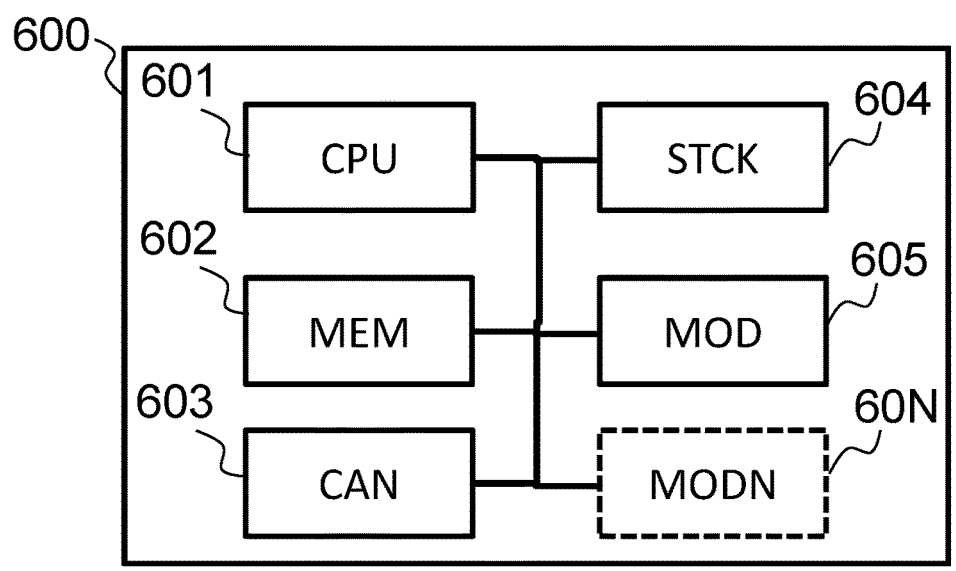
FIG. 6 illustrates schematically a hardware architecture of equipment for a calibration solution according to one embodiment of the invention.

FIG. 6 illustrates schematically the hardware architecture of equipment 600 comprising an array of radio antennas, each antenna being connected via at least one reception channel associated with a processing unit adapted for implementing a beamforming technique, the equipment being characterised in that it comprises a switching device placed as a cutoff between the antennas and the associated reception channels. The equipment is adapted for performing all or some of the steps of an autocalibration method. The equipment 600 may be the equipment illustrated in FIG. 3, this equipment 600 comprising the switching device 200 previously described.

Thus the electronic device 600 comprises, connected by a communication bus: a processor or CPU (central processing unit) 601; a memory MEM 602 of the RAM (Random Access Memory) and/or ROM (read only memory) type, possibly at least one analogue to digital converter CAN 603, a storage module STCK 604 of the internal storage type and possibly a plurality of antennas 605 to 60N connected to the analogue to digital converter CAN 603. The storage module STCK 604 may be of the hard disk HDD (hard disk drive) or SSD (solid-state drive) type or of the external storage medium reader type, such as an SD (Secure Digital) card reader. The processor CPU 601 can record data, or information, in the memory MEM 602 or in the storage module STCK 604. The processor CPU 601 can read data recorded in the memory MEM 602 or in the storage module STCK 604. These data may correspond to configuration parameters. The analogue to digital converter CAN 603 enables an analogue electrical signal coming from an antenna 605 to 60N to be converted into a digital signal that can be processed by the processor CPU 601 or by a dedicated electronic component, for example a microprocessor dedicated to the processing of the signal (or DSP, standing for digital signal processor), a component dedicated to the processing of the signal (or ASIC, standing for application-specific integrated circuit), or a programmable electronic component (or FPGA, standing for field-programmable gate array).

The processor CPU 601 is capable of executing instructions loaded in the memory MEM 602, for example from the storage module STCK 604. When the equipment 600 is powered up, the processor CPU 601 is capable of reading instructions from the memory MEM 602 and executing them. These instructions form a computer program causing the implementation, by the processor CPU 601, of all or some of the methods and steps described above, particularly the autocalibration method. Thus all or some of the methods and steps described above can be implemented in software form by the execution of a set of instructions by a programmable machine, such as a DSP (digital signal processor) or a microcontroller. All or some of the methods, steps and functions described here can be implemented in hardware form by a machine or a dedicated component, such as an FPGA (field-programmable gate array) or an ASIC (application-specific integrated circuit).

The invention claimed is:

1. An equipment comprising an array of radio antennas, each antenna being connected via at least one associated reception channel to a processing unit adapted to implement a beamforming technique, wherein the equipment comprises a switching device placed as a cutoff between the antennas and the associated reception channels, the switching device comprising:
- input interfaces in the same number as the antennas, each input interface allowing a connection of an antenna,
- output interfaces in the same number as the reception channels, each output interface allowing a connection of a reception channel,
- the switching device comprising two operating modes:
- a first so-called operational operating mode, each input interface then being connected directly to a different output interface in order to connect each antenna with at least its associated reception channel, a second so-called calibration operating mode, an input interface corresponding to a predetermined antenna then being connected to all the output interfaces in order to transmit the electrical signal coming from the predetermined antenna to all the reception channels, the equipment being adapted to implement a method for calibrating the reception channels when the switching device is in the second operating mode, wherein the switching device further comprising:

a chain of electrical-signal divider elements, each divider element comprising one input and two outputs, the input of a first divider element of the chain being connected to the input interface of the predetermined antenna, an output of the first divider element being connected to the output interface corresponding to the input interface, the chain of divider elements being adapted to divide the electrical signal coming from the input interface connected to the predetermined antenna into as many electrical signals are there are reception channels, switches, each switch comprising two inputs and one output, the outputs of the switches being connected to each output interface, except for the one corresponding to the reception channel of the predetermined antenna, each input of the switches being connected to an input interface and to a divider element of the chain of divider elements, the switching element making it possible to connect one or other of these two inputs to the output interface, the switches being adapted for:

in the first operating mode, transmitting the electrical signal coming from each input interface to at least one output interface, each antenna then being connected at least to its associated reception channel, in the second operating mode, transmitting the electrical signal coming from the divider element, the predetermined antenna then being connected to all the reception channels.

2. The equipment according to claim 1, the equipment comprising:

a measuring unit, adapted to capture an electrical signal output from each reception channel and to determine physical parameters associated with said electrical signal, a compensation device, adapted to configure each reception channel according to the physical parameters associated with the electrical signals determined at the output of the reception channels.

3. The equipment according to claim 1, the equipment comprising:

an electrical-signal divider element connected to each input interface, except for the one connected to the predetermined antenna, an output of the divider element being connected to the switch connected to the output interface corresponding to the input interface, the other output being connected to a predetermined impedance matching load, a divider element and a switch connected in series, the outputs of the divider element being connected to the inputs of the switch, and placed as a cutoff between the output of the first divider element connected to the output interface corresponding to the input interface and said output interface.

4. A method for the autocalibration of equipment comprising an array of radio antennas and a switching device placed as a cutoff between the antennas and associated reception channels connected to the antennas, the method comprising:

in a first operating mode, transmitting, by switches, an electrical signal coming from each input interface of the switching device to at least one output interface of the switching device, each antenna then being connected at least to its associated reception channel, each switch comprising two inputs and one output, the outputs of the switches being connected to each output interface, except for one corresponding to a reception channel of a predetermined antenna, each input of the switches being connected to an input interface and to a divider element of a chain of divider elements, an input of a first divider element of the chain being connected to an input interface of the predetermined antenna, an output of the first divider element being connected to the output interface corresponding to the input interface, the chain of divider elements being adapted to divide the electrical signal coming from the input interface connected to the predetermined antenna into as many electrical signals are there are reception channels;

in the second operating mode, transmitting, by the switches, an electrical signal coming from the divider element, so that an input interface corresponding to a predetermined antenna is connected to all the output interfaces so as to transmit the electrical signal transmitting from the predetermined antenna to all the reception channels;

calibrating the reception channels when the switching device is in the second operating mode;

switching the switching device into the second operating mode, capturing an electrical signal output from each reception channel, determining physical parameters associated with said electrical signals, configuring each reception channel according to the physical parameters associated with the electrical signals determined at the output of the reception channels, switching the switching device into the first operating mode.

5. A nontransitory computer readable medium embodying a computer program comprising instructions for implementing, by a processor of equipment comprising an antenna array, a method according to the claim 4, when the computer program is executed by the processor.

* * * * *